United States Patent [19]

Dietrich

[11] 4,378,185

[45] Mar. 29, 1983

[54] TOOL DRIVING APPARATUS

[76] Inventor: Otto E. Dietrich, 617 W. Jackson St., Morton, Tazewell County, Ill. 61550

[21] Appl. No.: 99,418

[22] Filed: Dec. 3, 1979

[51] Int. Cl.³ .......................... B23Q 5/22; B23B 39/20
[52] U.S. Cl. ...................................... 408/140; 408/35; 192/53 B
[58] Field of Search ................ 408/35, 117, 226, 126, 408/239 A, 140; 279/1 Q, 75, 86, 97; 192/53 B

[56] References Cited

U.S. PATENT DOCUMENTS

| | | | |
|---|---|---|---|
| 2,991,666 | 7/1961 | Charlat | 408/35 |
| 3,909,151 | 9/1975 | Regenbrecht | 408/140 |
| 4,006,996 | 2/1977 | Kasabian | 408/226 |
| 4,107,949 | 8/1978 | Wanner et al. | 279/75 |
| 4,167,362 | 9/1979 | Dietrich | 408/35 |
| 4,211,509 | 7/1980 | Dietrich | 408/35 |

*Primary Examiner*—Leonidas Vlachos

[57] ABSTRACT

A power tool includes a turret rotatably mounted on a hub, a first shaft rotatably mounted in the hub and a second shaft mounted for rotation in the turret and for aligned rotating engagement with the first shaft in the hub. First and second members, including a resilient member, are provided in the first shaft for engaging the second shaft.

3 Claims, 10 Drawing Figures

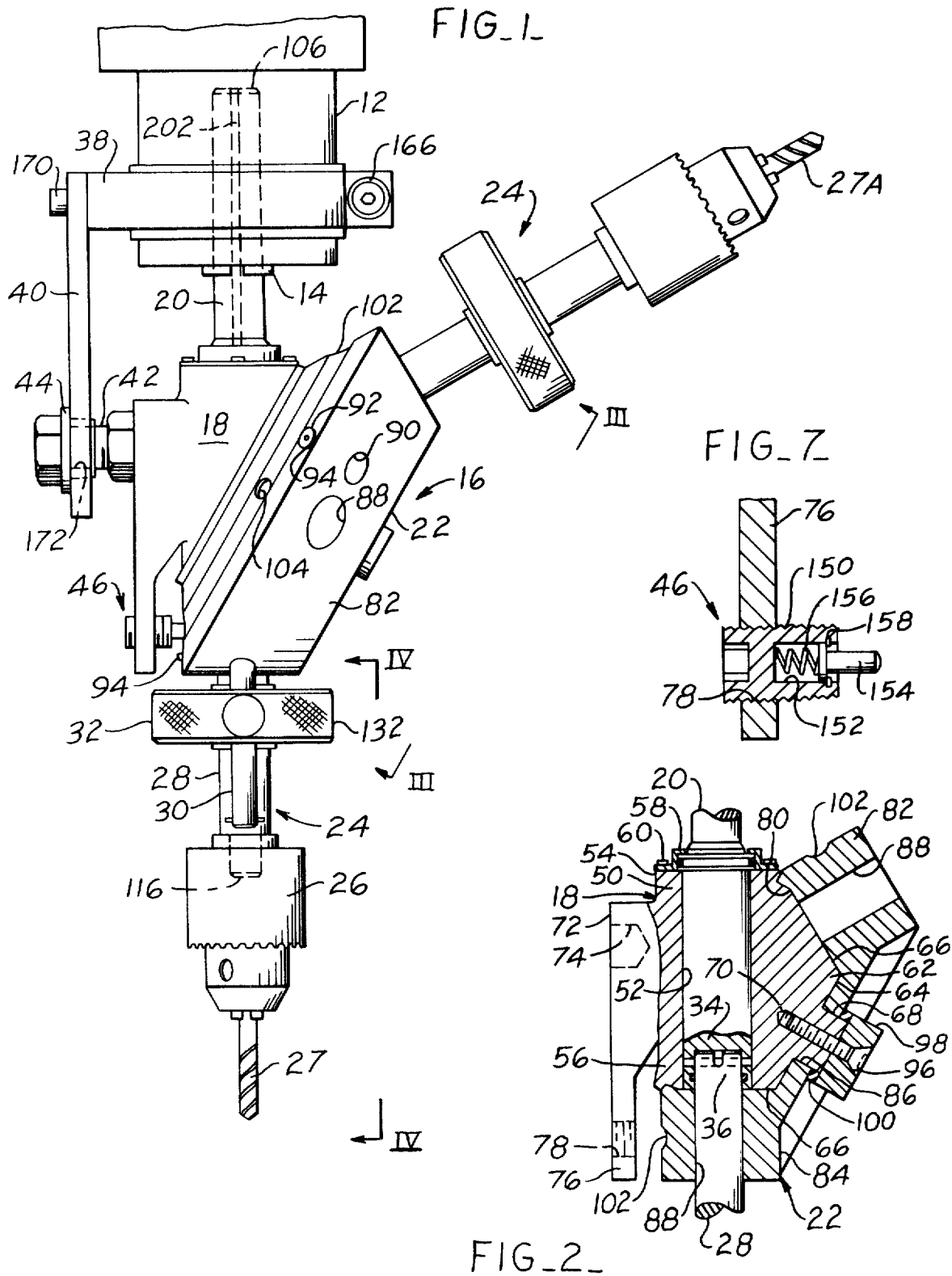

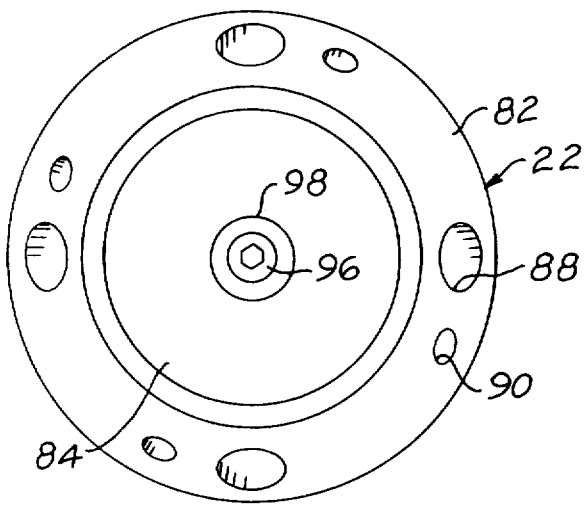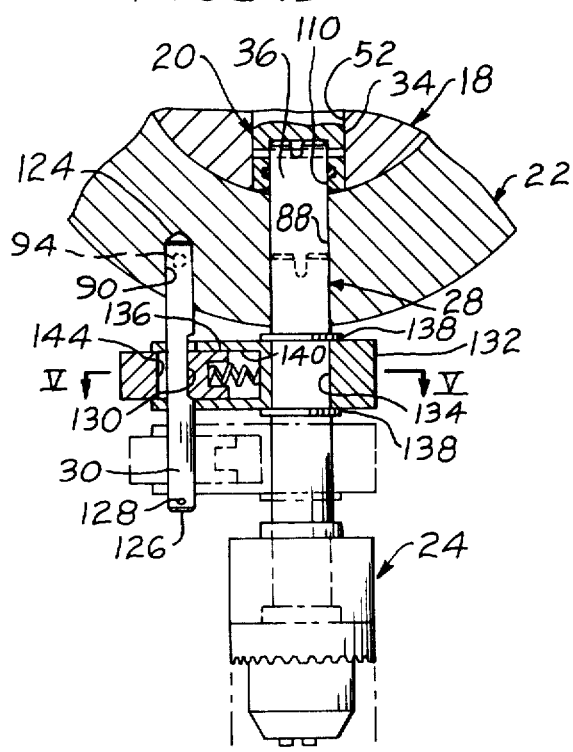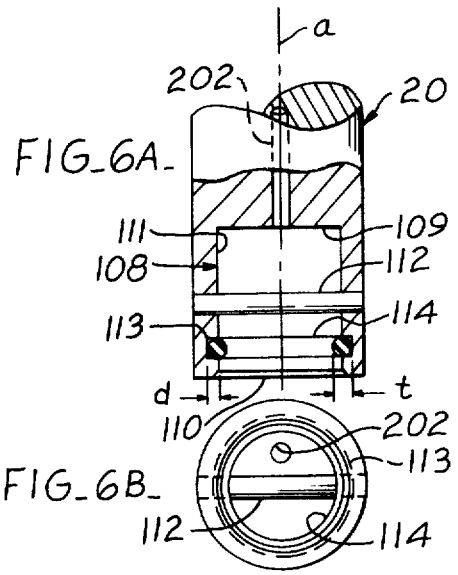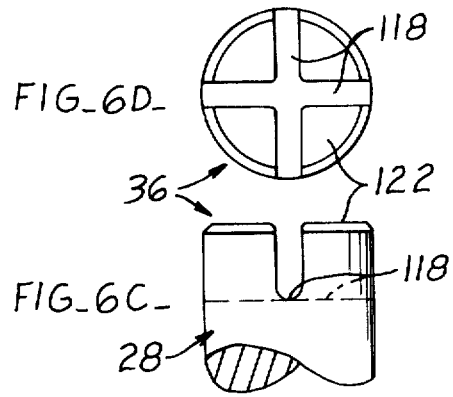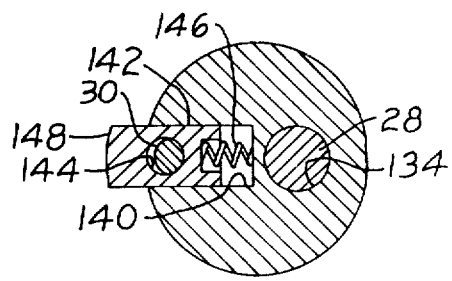

TOOL DRIVING APPARATUS

DESCRIPTION

1. Technical Field

This invention relates generally to cutting by use of rotating, axially moving tools and more particularly to a machine including a turret of tools.

2. Background Art

Generally, powered machine tools have provided multiple tool driving attachments wherein a turret includes a plurality of chucks positionable so as to be driven by a single powered driver. The turret is mounted to rotate about a hub. This is convenient since a variety of attachments are mounted in each chuck and readily available for positioning to be powered by the driver. This eliminates changing various attachments into and out of a single chuck. The single powered driver is rotatably mounted in a bore formed through the hub. A driven member, rotatably mounted in the turret can be aligned with and then engaged with the driver in the hub bore while the driver is rotating. Rotation of the driver and driven member in the hub bore can cause excessive wear in the hub causing the bore to enlarge. As a result, the driver and driven member can become sloppy or loose while engaged in the hub. This causes alignment to be difficult and accelerates further wear in the hub bore.

Engaging the rotating driver and a non-rotating driven member can cause brief shock and vibration to the apparatus. Eventually, the shock of repeated engagement of the members can be a further cause of loose or sloppy connection which can become intolerable for precision machining.

The foregoing illustrates limitations of the known prior art. Thus, it is apparent that it would be advantageous to provide an alternative to the prior art. Accordingly, the present invention is directed to overcoming one or more of the limitations as set forth above.

DISCLOSURE OF INVENTION

In one aspect of the present invention, this is accomplished by providing a tool driving apparatus including a turret rotatably mounted on a hub, a first or driving shaft rotatably mounted in the hub and a second or driven shaft mounted for rotation in the turret and for aligned rotating engagement with the first shaft in the hub. A socket or bore is formed in one end of the driving shaft. First and second means are provided in the bore for engaging the driven shaft. One of the engaging means is a resilient member.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a side elevation illustrating the preferred multiple tool driving turret attachment of this invention;

FIG. 2 is a partial cross-sectional side elevation illustrating the sleeve and a portion of the attachment of FIG. 1;

FIG. 3 is a frontal view of the turret taken along lines III—III of FIG. 1;

FIG. 4 is a frontal view of the attachment in partial cross-section taken along lines IV—IV of FIG. 1;

FIG. 5 is a cross-sectional view taken along the lines V—V of FIG. 4;

FIG. 6A is an elevational view illustrating a portion of the first tool driving member of this invention;

FIG. 6B is an end view of the first tool driving member of FIG. 6A;

FIG. 6C is an elevational view illustrating a portion of the second tool driving member of this invention;

FIG. 6D is an end view of the second tool driving member of FIG. 6C; and

FIG. 7 is a partial cross-sectional side elevation illustrating a resiliently urged member for aligning the first and second tool driving members of this invention.

BEST MODE FOR CARRYING OUT THE INVENTION

Referring now to the drawings, FIG. 1 illustrates the environment of this invention. For example, a well known tool driving machine, such as a drill press, vertical mill or the like, is generally designated 10. Such tool driving machines generally include a column 12 having a rotatable driving member such as spindle 14 powered by a power source such as an electric motor (not shown).

A common attachment to tool driving machine 10 is a multiple tool driving turret attachment generally designated 16 and including a hub 18. A first tool driving means or shaft 20 is mounted for rotation in hub 18. Shaft 20 may be secured to and powered by spindle 14. A turret 22 is mounted for 360 degree rotation on hub 18 and includes a plurality of second tool driving means generally designated 24. Such second tool driving means 24 includes well known chucks 26 and their associated shafts 28. By virtue of the turret 22 being rotatable on hub 18, second tool driving means 24 may be moved relative to hub 18 so that shaft 28 is aligned with shaft 20. Upon engagement of shafts 28 and 20, the power supplied by tool driving machine 10 is transmitted through spindle 14 and shaft 20 to shaft 28 and ultimately to chuck 26. Thus, a plurality of chucks 26 may be equipped with various tool attachments such as different sized drill bits 27, 27a, taps and the like, providing the operator of machine 10 with the ability to make relatively quick changes for tooling operations by selective positioning of turret 22 on hub 18 without the necessity of turning off the power to machine 10 while making such tooling changes.

Generally, the enviornment of the present invention includes an end 34 of shaft 20, keyed for mating engagement with an aligned keyed end 36 of shaft 28, and means operable, in response to the alignment of shafts 20 and 28, for guiding and locking shaft 28 into and out of rotating engagement with shaft 20 when shaft 20 is rotating. Such operable means generally includes a guide shaft 30. A resilient locking device 32 is included for locking shafts 20, 28 into engagement. A collar 38 clamps onto column 12 and a slide 40 is connected to and extends from collar 38. Hub 18 connects to slide 40 by means of a bolt 42 extending through a resilient grommet 44. Further, the environment of this invention includes resiliently urged means, 46 in FIG. 1, operably connected for aligning first and second shafts 20, 28, respectively.

More specifically now, a preferred hub 18, FIG. 2, is of cast iron but can be made of other suitable material. Hub 18 includes a first portion 50 including an annular throughbore 52 for accommodating shaft 20 for rotation therein. Bore 52 extends through portion 50 from a first end 54 to a second end 56. A suitable bearing collar 58 is attached to first end 54 of bore 52 by screws 60. A second portion 62 is generally frustoconical and includes surfaces 64,66 for receiving turret 22. A portion 68 protrudes from surface 64 through turret 22 and includes a threaded aperture 70 therein. A flange 72, formed with hub 18 includes a threaded aperture 74 formed therein for receiving bolt 42. Flange 72 also includes flange arm 76 including a threaded aperture 78 formed therein for receiving resiliently urged aligning means 46 therein.

Turret 22, FIGS. 1, 2 and 3, is generally annular and preferably of cast aluminum. The turret includes generally concave surface 80 usually lubricated for mating, rotating engagement with surfaces 64,66 of hub 18. The turret also includes generally convex surface 82 having an annular relief 84 therein. An opening 86, best shown in FIG. 2, is formed through turret 22 for receiving protruding portion 68. A plurality of annular bores 88 are formed through turret 22 for slidably receiving shafts 28 therethrough, see FIGS. 1, 2, 3. Bores 88 are preferably annularly spaced about turret 22. Bores 88 are of the same diameter as bores 52. Depending on the size of turret 22, the number of bores 88 may vary. A second plurality of blind bores 90, FIGS. 1, 3, are provided in surface 82 for receiving guide shafts 30 therein. A third plurality of blind bores 92 are formed in turret 22 and extend to intersect bores 90. Bores 92 are threaded to receive set screws 94 for engagement with, and securing of, guide shafts 30 in bores 90. Turret 22 is preferably rotatably secured to hub 18 by a well known screw 96, thrust washer 98 and washer 100. Screw 96 is received into threaded aperture 70 of hub 18. An annular groove 102 may be provided in turret 22 for guiding resiliently urged alignment means 46 along the turret. However, turret 22 rotates in a fixed path relative to alignment means 46 so that formation of a groove 102 is not essential. Whether or not groove 102 is provided, a plurality of detents 104 are necessary to receive resiliently urged alignment means 46. Detents 104 are located on turret 22 to engage alignment means 46 at selective positions providing for alignment of bores 52,88 and their respective shafts 20,28.

First tool driving means or shaft 20, FIGS. 1 and 2, is mounted for rotation in bore 52 of hub 18. Shaft 20 is preferably of a suitable steel and includes a first end 106 secured in collar 12 by spindle 14 as is well known. Shaft 20 extends from spindle 14, through collar 58 and terminates within bore 52 at a keyed second end 34. Shaft 20 must not extend beyond surface 66 of hub 18, otherwise the shaft would interfere with relative movement between turret 22 and hub 18. Shaft 20 is secured by collar 58 to permit rotation within hub 18 but to limit axial movement within the hub. Keyed end 34 of shaft 20, terminates adjacent turret 22 so as not to interfere with rotation of turret 22 on hub 18, see FIG. 4. Keyed end 34 of shaft 20, FIGS. 6A-B, includes a bore 108 formed therein. Bore 108 includes a seat 109, a mouth 110, and an annular circumferential surface 111.

A first means, such as a suitable steel pin 112, is mounted in shaft 20 for engaging second shaft 28. Pin 112 is secured in shaft 20 by any suitable manner so as to extend through bore 108 intermediate of seat 109 and mouth 110 and so as to be transverse to the longitudinal axis "a" common to shaft 20 and bore 108. Mouth 110 is preferably chamfered to ease entrance of shaft 28 into bore 108.

Means, such as an annular groove 113, is formed in surface 111 for retaining a resilient annular "O" type ring 114 in bore 108. Ring 114 has a thickness "t" greater than the depth "d" of groove 113 which causes ring 114 to protrude into bore 108 for interference fitting engagement with second shaft 28. In this manner; ring 114 functions as a second means for engaging second shaft 28. Groove 113 and associated ring 114 are preferably intermediate of mouth 110 and pin 112. A vent 202, see FIGS. 1, 6A and 6B, provides a route for venting air in hub 18 between first and second shafts 20,28 to the atmosphere.

Second tool driving means 24, FIG. 1, are each movably mounted on hub 18 for alignment with shaft 20 by virute of their attachment to turret 22. Each of the second tool driving means includes a well known, commercially available chuck 26 for accommodating any of several well known bits used with such chucks such as drill bits 27,27a, mills, taps, or the like, and a shaft 28 secured to chuck 26 at a first end 116 and terminating at a keyed second end 36, see FIGS. 1 and 6C-D. Shaft 28 is the same diameter as shaft 20 and is secured to chuck 26 for rotation therewith. Keyed end 36 of shaft 28 includes a plurality of keyways or slots 118 sufficient for receiving pin 112. Surfaces 122, between each slot 118, are rounded or chamfered to guide pin 112 into any one of the slots 118.

Means are operable for moving shaft 28 into and out of rotating engagement with shaft 20. This is accomplished by the use of guide shaft 30 and resilient locking device 32. Shaft 30 can be of any suitable material but is preferably of steel. Shaft 30 is of a smaller diameter than shaft 20 and 28. First end 124 of shaft 30 may be inserted into bore 90 of turret 22 and secured therein by set screw 94, see FIGS. 1 and 4. Shaft 30 thus protrudes from turret 22 and terminates at second end 126 including pin 128 inserted therethrough. A notch 130 is formed in shaft 30 between ends 124,126 for receiving a portion of resilient locking device 32. Resilient locking device 32 comprises an annular aluminum housing 132 including an axial bore 134 for receiving shaft 28 for rotation therein and an axial bore 136 for receiving shaft 30 therethrough, see FIGS. 4 and 5. Thus, locking device 32 interconnects shafts 28 and 30. Shaft 28 is locked into fixed relationship with housing 132 by snap rings 138 to permit shaft 28 and housing 132 to move toward and away from shaft 20. Shaft 30 is slidably engaged in bore 136. A radially directed blind bore 140 is formed in housing 132 and intersects bore 136. A tab 142 is resiliently mounted in blind bore 140 by spring 146. An axial bore 144 is provided through tab 142. Bore 144 is the same diameter as bore 136 for slidably receiving shaft 30. Thus, due to the presence of notch 130, tab 142 is urged into locking engagement with shaft 30 as shaft 28 and housing 132 are slidably moved in bore 88 toward shaft 20. Similarly, tab 142 may be hand depressed at button end 148 so as to be urged out of locking engagement with notch 130.

Resiliently urged aligning means 46, FIGS. 1 and 7, is preferably provided by threaded member 150 mounted in threaded aperture 78 of flange arm 76. Blind bore 152, formed in member 150, includes a plunger 154, preferably of a suitable synthetic material, resiliently urged by spring 156, or the like, against a stop 158 for limited movement relative to member 150. Threaded member 150 is commercially available. Plunger 154 is urged into groove 102 by spring 156 or, in the absence of a groove, against turret 22 until the plunger is urged into one of the detents 104 indicating alignment of bores 52,88 and their respective shafts 20,28.

Industrial Applicability

Attachment 16 is connected to machine 10 by securing clamp 38 to column 12. Hub 18 is limited from rotation by securing bolt 42 to slide 40. Also vibration damping between attachment 16 and machine 10 is enhanced by the use of grommet 44 between hub 18 and slide 40.

Second tool driving means 24 is secured to turret 22 due to shaft 30 being retained in bore 90 by set screw 94. For rotation of turret 22 on hub 18, shaft 28, resilient locking member 32 and chuck 27 move as a unit to retract shaft 28 from bore 52 and out of engagement with shaft 20. This is accomplished by hand depressing button end 148 to release tab 142 from notch 130. Thus with bores 144,136 aligned, locking member 32, shaft 28 and chuck 26 are movable on guide shaft 30 to a position where locking member 32 engages pin 128, see FIG. 4. In this mode, turret 22 may be freely rotated on hub 18. This can be accomplished when shaft 20 is rotating due to power supplied by machine 10 through spindle 14.

Assuming that shaft 20 is rotating, and a specific tool operation is to be performed, the chuck 26 which holds the desired tool may be rotated with turret 22 to the lowermost position directly below and aligned with column 12. As turret 22 is rotated, plunger 154 tracks on turret 22 and automatically snaps into and out of detents 104. When plunger 154 snaps into a detent 104 and the desired chuck is directly below column 12, this indicates that bore 108, and one of the associated bores 88 are aligned. Also, shaft 20 and an associated shaft 28 are aligned. Upward force applied to second tool driving means 24 will urge shaft 28 upwardly, guided by shaft 30 and lock 32. With the upward force maintained, shaft 28 and resilient ring 114 will engage and due to the interference fit between shaft 28 and ring 114, shaft 28 will begin to rotate with shaft 20. By maintaining the upward force, slots 118 and pin 112 will become engaged and tab 142 will be in a position to snap into engagement with notch 130 for maintaining shafts 20,28 in locked rotating engagement. The above procedure can be repeated for selectively disengaging and engaging any of the second tool driving means with the first tool driving means. Since shafts 20,28 are rotating at similar speeds prior to engagement of pin 112 in one of slots 118, shock and vibration are substantially reduced when engagement of those shafts is actually made.

Advantageously, shaft 20 extends entirely along the length of bore 52. Thus, shaft 28 engages shaft 20 within bore 108 and the engagement of shafts 20,28 are not in direct contact with bore 52. As a result, excessive wear causing premature enlargement of bore 52 is substantially limited since alignment of shafts 20,28 is maintained by inner surface 111 of bore 108. Possible misalignment of engaged shafts 20,28 rotating in bore 52, and the resultant excessive wear caused thereby is avoided due to the coupling effect of bore 108 as it engages a portion of shaft 28 adjacent the point at which those shafts are engaged.

The foregoing has described a tool driving apparatus for use with a powered tool driving machine. First and second tool driving members may be selectively engaged and disengaged while they are rotating.

It is anticipated that aspects of the present invention, other than those specifically defined in the appended claims, can be obtained from the foregoing descritpion and the drawings.

I claim:

1. A tool-driving attachment of the type including a turret rotatably mounted on a hub, a driving shaft rotatably mounted in the hub and a driven shaft mounted for rotation in the turret and for aligned rotating engagement with the driving shaft in the hub, the driving shaft having a bore formed therein, the driven shaft having a plurality of slots formed in an end thereof, the bore having a mouth at one end and means for drivingly engaging the slots at an opposite end, the improvement comprising:

resilient means adjacent the mouth of the bore for engaging and for rotating said slotted end of said driven shaft in response to said slotted end entering said mouth and prior to said slotted end engaging said driving engagement means, said resilient means including an annular member mounted in and protruding into said bore.

2. The tool driving apparatus of claim 1 wherein said driving shaft further includes an annular groove formed in a circumferential surface of said bore.

3. The tool driving apparatus of claim 2 wherein said resilient member is an annular "O" ring mounted in said groove in interference fitting engagement with said second shaft, said groove having a depth "d" and said ring having a thickness "t," said thickness being greater than said depth.

* * * * *